United States Patent [19]

Worley

[11] 4,103,539

[45] Aug. 1, 1978

[54] NON-DESTRUCTIVE REFRACTORY EROSION INDICATOR

[75] Inventor: Arthur C. Worley, Morristown, N.J.

[73] Assignee: Exxon Research & Engineering Co., Linden, N.J.

[21] Appl. No.: 766,129

[22] Filed: Feb. 7, 1977

[51] Int. Cl.$^2$ ............................................. G01N 3/56
[52] U.S. Cl. ................................... 73/86; 116/114 Q
[58] Field of Search .................... 73/86, 7; 116/114 Q

[56] References Cited

U.S. PATENT DOCUMENTS

| 2,233,403 | 3/1941 | Dickinson et al. | 73/7 |
| 2,976,716 | 3/1961 | Haven | 116/114 Q X |
| 3,842,792 | 10/1974 | Souther | 116/114 Q |

*Primary Examiner*—Jerry W. Myracle
*Attorney, Agent, or Firm*—F. Donald Paris

[57] ABSTRACT

A refractory erosion indicator gage for use in blast furnaces and other equipment which require an indication of the erosion wear in the refractory or other lining. The erosion indicator comprises a structural plate member having a configuration preferably triangular. The member is welded within the refractory lining of the equipment in which it is employed. This may be accomplished by welding the plate member to the equipment shell before the refractory lining insulation is installed or alternatively, it may be provided within the refractory lining per se and secured to the shell with the refractory. As the new refractory surface wears or erosion takes place, the exposed portion of the triangle is determinative of the remaining actual thickness of the refractory lining or of the amount of lining eroded away, depending on the orientation of the plate. This permits an easy determination to be made of the remaining refractory life. Thus, the time for replacement of the refractory can be easily determined by visible observation of the indicator or indicators in the equipment internal lining.

7 Claims, 5 Drawing Figures

NON-DESTRUCTIVE REFRACTORY EROSION INDICATOR

BACKGROUND OF THE INVENTION

The present invention relates to erosion determination and more particularly, to an improved means for providing an accurate indication of the corrosion rate in operating equipment to facilitate meaningful inspection of such equipment for determining when refractory lining replacement should take place.

In those instances such as in catalytic cracking units and other petroleum process operations, the equipment employed typically has an interior lining such as a refractory lining. These linings are particularly important to the proper operation of the equipment including maintaining the heat within the particular piece of equipment, as well as preventing the outer shell of the body from being damaged due to the excessive heat. It is typical to line such equipment with a refractory material and to employ various types of means in order to determine the rate of erosion of the lining so that the lining can be replaced when it has gone from its original thickness to an eroded thickness which is below a predetermined replacement value. Presently, various unsatisfactory methods and techniques for determining the erosion rate are employed, none of which provide an accurate, simple and inexpensive erosion rate determination indicator which can be applied to all types of refractory linings and for any lining thickness.

Prior art techniques include those which are not only complex and costly, but are also sensitive to physical damage and are unreliable especially when installed in equipment such as cyclones. For example, U.S. Pat. No. 3,842,792 discloses a visible monitor indication for determining seal wear in a combustion engine; however, the device disclosed is not applicable to where impingement and erosion takes place over an entire surface but rather to a particular location.

Other devices are disclosed in U.S. Pat. No. 2,915,305 which discloses an embedded thermocouple responsive to temperature changes for providing information on the formation and shape of an eroded area in a blast furnace. Reliance on electrical conductivity changes indicate the progress of erosion. U.S. Pat. No. 3,015,950 discloses an electrically sensitive sensor whose electrical properties are proportional to its length and is embedded in a body with its length corresponding to the thickness of the body. Erosion of the body and element occur simultaneously and thus, a decrease in length of the latter corresponds to the thickness of the body. U.S. Pat. No. 3,078,707 discloses a gage in a refractory wall of a blast furnace for measuring thickness of material and employing gradually eroded wires along with the erosion of the furnace wall for facilitating periodic measurements of the remaining thickness of the wall and the rate of destruction thereby being easily determined. Other patents such as U.S. Pat. Nos. 3,236,096 and 3,307,401 disclose other techniques for measuring the amount of erosion or wall thickness of a furnace, whereas U.S. Pat. No. 3,362,810 discloses physical arrangement for visible indication of corrosion, destruction or erosion.

None of these prior art techniques, however, disclose an arrangement which provides for visible indication of erosion of a specific and/or overall surface area by exposure of increasingly greater portions of a non-destructive member which is indicative of the erosion and aids in determination of the remaining thickness. Such a device would be relatively simple, economical and not sensitive to physical damage and have applicability for all types of linings, refractories and otherwise. An arrangement of these devices within a unit such as a cyclone can establish accurate erosion profiles.

SUMMARY OF THE INVENTION

According to the present invention, there is provided a non-destructive refractory erosion indicator for use in a blast furnace wall or other fluid solid unit for indicating erosion wear of refractory or other lining. Basically, the indicator comprises a steel plate having configuration, preferably in the form of an isosceles right triangle, and which is welded preferably in an upright position within the refractory reinforcing mesh lining of the equipment being monitored. As the refractory surface wears or erosion takes place, the normally enclosed uncovered portion of the plate is determinative of the remaining actual thickness of the refractory or the orientation of the plate can be such that the amount of material eroded away can be determined, which permits a further determination to be made of the remaining refractory and its life. An overall profile over a relatively large surface area also can be obtained according to this invention by an appropriate array of indicators. The present device is particularly useful for determining erosion wear and in complex lined equipment, such as cyclones, where the geometric surface changes can affect the erosion or wear by virtue of the high velocity gas or catalyst flow therein. Visual indicators such as those according to the present invention distributed over the surface is a practical means for accurately determining such wear. The low-cost simple construction of the present indicator makes this possible and by suitably distributing the indicator gages, erosion profiles can be determined relatively easily and in a non-complex, economical, reliable manner.

Having in mind the foregoing that will be evident from an understanding of this disclosure, the invention comprises the construction and arrangement of indicator gages and their use for erosion/wear determination as disclosed in the preferred embodiment of this invention which is hereinafter set forth in such detail as to enable those skilled in the art readily to understand the function operation, construction and advantages of it when read in conjunction with the accompanying drawings.

DESCRIPTION OF THE PREFERRED EMBODIMENT

Figure 1:
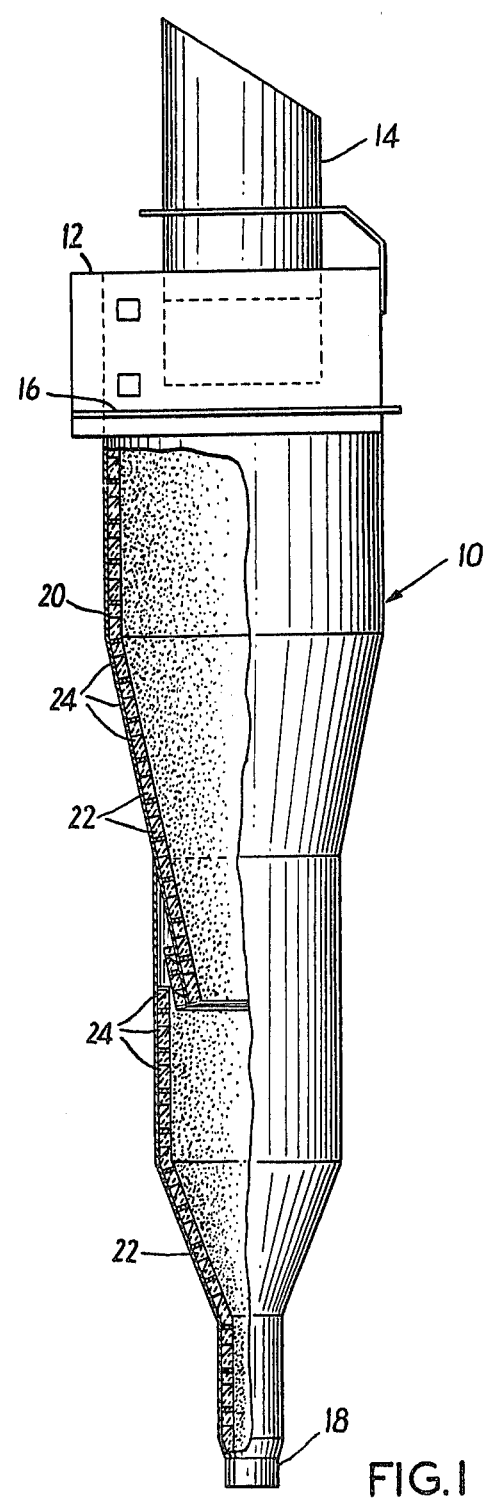
FIG. 1 is a typical partial cross-sectional view of a cyclone employing erosion indicators constructed and arranged according to the present invention.
Figure 2:
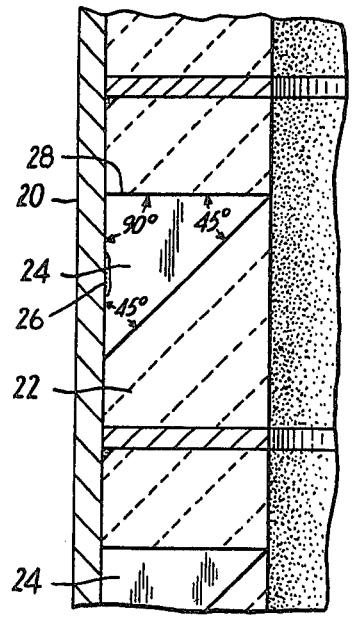
FIG. 2 illustrates an enlarged cross-sectional view of a portion of the refractory lining of the cyclone of FIG. 1 as originally installed.

Referring now to the drawings wherein like parts are designated by the same reference numeral throughout the several views, there is shown in FIG. 1 a piece of typical equipment in which the present invention may be employed. The equipment shown is a typical secondary cyclone 10 of conventional configuration including an inlet 12, an outlet 14 and a standard anti-coking baffle support 16 (which is only used for certain reactor cyclones). Typically a dipleg (not shown) is attached at the bottom end 18 of the cyclone. The cyclone comprises an outer shell 20 and includes a lining 22 which normally is disposed about the complete inner surface of the cyclone shell and is conventionally secured to the inner surface of the shell by appropriate fastening means (e.g., welded clips or studs). The foregoing are essentially conventional items and accordingly no further discussion thereof will be made in this application, since reference to numerous conventional texts and prior art publications are available for further explanation of these details, which are not necessary for an understanding of the present invention. Disposed within the refractory lining are a plurality of erosion indicator gages generally designated 24. Basically each indicator comprises a plate member made of a suitable metal which is non-destructive when exposed to the temperatures at which cyclones or other lined equipment operate and having an isosceles right triangle configuration. The indicators can be tack welded to the inner surface of the cyclone shell as shown at 26, whereupon the refractory then can be installed within the cyclone over the gages. The thickness 28 of the indicator has an equal base length corresponding to the thickness of the lining as shown in FIG. 2. While an isosceles right triangle is employed for the preferred embodiment, it is also within the contemplation of the present invention to employ other suitable shapes and configurations (e.g. where erosion loss can be determined by visual measurement of the exposed edge of the gage and a trigonometric relationship between the base and height of the device) so long as the length of the side of the member extending from the inner surface outward to the innermost surface of the lining, corresponds to the thickness of the refractory lining when new, i.e. originally installed. The triangle 24 can be flipped over so that the hypotenuse is perpendicular to the orientation shown.

Figure 3:
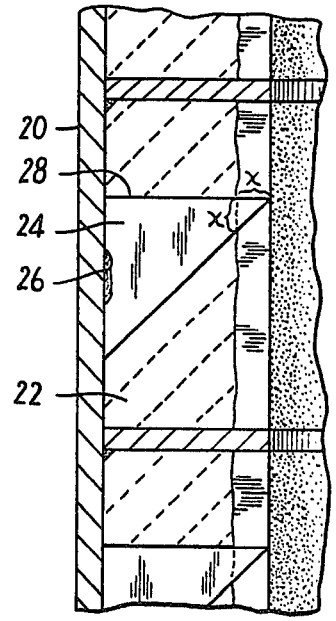
FIG. 3 illustrates the same view as FIG. 2, only with the refractory lining partially eroded.

Turning now to FIG. 3, it will be seen that a portion of the refractory lining 22 has eroded, thus exposing a portion of the indicator base equal to an amount designated "X". Thus, by visually observing the indicator through a convenient peephole or the like, one easily can directly determine that in that general area the refractory has eroded or been worn by an amount "X". The actual amount of erosion can be readily determined since the original length of the base corresponds to the thickness 28 of the refractory and is known. This determination is accomplished through the use of isoceles right triangle for direct loss delimations. For other type members the geometry must be specific so that a trigonometric relationship can be used in conjunction with the visual observation to determine the loss. By distributing these indicators or erosion gages over the surface of the body or equipment within the refractory lining, one can easily plot a profile of the refractory wear or erosion. The actual visual observation while not completely accurate can be aided by means of a number of gages installed at the same level in the equipment so as to obtain a number of measurements for increase accuracy the amount of erosion or wear of the refractory lining. For example, to develop an appropriate profile a predetermined number of gages per square foot of lined surface can be employed, the number depending upon the amount of profile desired. Prior to installation of the gages, the number and spacing thereof can be selected to provide the desired erosion indication profile. As shown, the right triangles are placed in an upright position, that is with one of the equal length legs of the triangle equal to the refractory lining thickness as discussed above, which permits easy determination of corrosion wear by measuring the triangle's metal edge exposed in the refractory lining surface, that is the amount of "X".

Typically, these gages can be made from carbon steel or alloy steel and preferably are welded to the component surface or the refractory reinforcing mesh or the refractory anchorage system prior to application of the erosion-resistant refractory to the equipment. The dimensions of the exposed portions or edges of the gages in the refractory surface change as wear or erosion of refractory surface occurs. These dimensional changes are employed to determine the loss and/or remaining thickness of the refractory from erosion. Direct measurement of the exposed metal can be employed to indicate actual lining thickness lost or to indicate remaining lining thickness simply by measuring exposed metal edges of the triangles by means of a ruler and subtracting it from the known original lining thickness. These gages can be employed in a single layer as well as in double layer linings. The latter would have gages in each of the lining layers. The value of these gages is particularly great for use in cyclones, piping, vessels, and other equipment which are subjected to erosion by fluids, since the linings do not have to be removed locally for thickness measurements.

Figure 4:
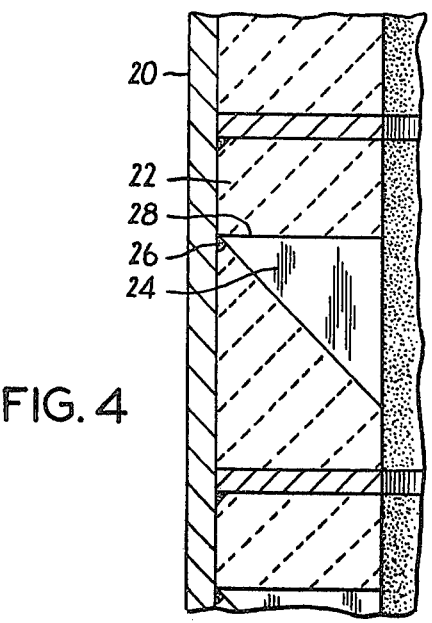
FIG. 4 illustrates an alternate embodiment of the preferred embodiment of the present invention with the outward orientation of the erosion indicator reversed from that shown in FIGS. 1-3.
Figure 5:
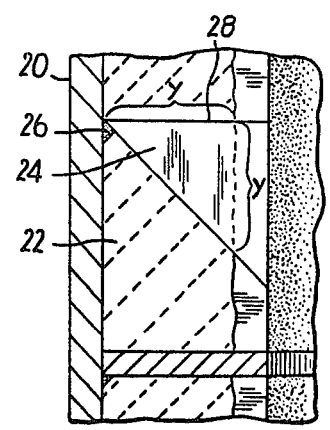
FIG. 5 illustrates the same general cross-sectional view as FIG. 4, only with the lining partially eroded.

An alternative arrangement for the preferred gages is shown in FIGS. 4 and 5, wherein the triangular members are welded at its end opposite the 90° angle of the plate member. In this way when there is wear or erosion of the lining as shown in FIG. 5, the extent of exposed metal in the lining surface (i.e. planar) equal to "Y" corresponds to the remaining amount of lining thickness, which gives a direct readout. In the other embodiment of FIGS. 2 and 3 the amount or extent of exposed metal in the lining surface corresponds to the actual loss of lining or amount worn. It does not give a direct readout whereas the embodiment of FIGS. 4 and 5 gives the direct measurement of remaining lining thickness.

Both embodiments, however, are generally useful depending upon the preferences of the measurements for the particular equipment involved. Both provide means for determining wear and/or erosion of the lining.

While preferred embodiments of the present invention have been shown and described in various modifications thereto suggested, it will be understood that the true spirit and scope of the invention is set forth in the appended claims which embrace other modifications and embodiments will occur to those of ordinary skill in the art.

Having thus set forth the nature of the invention, what is claimed herein is:

1. A gage for monitoring erosion and/or wear in combination with equipment having an erodable refractory lining, comprising: an indicator plate member disposed within the lining of said equipment having a triangular configuration including at least one dimension which corresponds to the original thickness of said lining of said equipment, said dimension being in the direction of the thickness of said lining, said indicator member comprising a material different from that of said refractory lining such that it is non-destructive during operation of said equipment, such that as said lining is eroded and/or worn from its original thickness said indicator member is exposed relative to the remaining thickness at said lining, whereby said indicator member provides monitoring means for determination of the erosion and/or wear of said lining.

2. The combination of claim 1 wherein said indicator member comprises a right triangular metal plate welded along one side to the inner surface of said equipment and having a base extending in the direction of the thickness of said lining, whereby the exposed portion of said base is determinative of the amount of lining eroded and/or worn.

3. The combination of claim 1 wherein said indicator member is triangular and welded to said equipment such that its base extends to the outer unworn surface of said lining and has its height disposed in alignment with said unworn surface, said member providing an indication of the actual remaining amount of said lining as said lining is worn and/or eroded.

4. The combination of claim 3 wherein said triangular member comprises an isosceles right triangle.

5. The combination of claim 1 wherein said triangular member comprises an isosceles right triangle.

6. The combination of claim 1 including a plurality of said plate members disposed in a predetermined array within said lining for providing a profile of the wear and/or erosion of said lining.

7. A gage for monitoring erosion and/or wear in combination with equipment having an erodable refractory lining, comprising: an indicator means member disposed within said lining having a configuration which has a trigonometric relation with respect to the thickness of said lining and including at least one dimension which corresponds to the original thickness of said lining of said equipment, said dimension being in the direction of the thickness of said lining, said indicator means comprising a material different from that of said refractory lining such that it is non-destructive during operation of said equipment, such that as said lining is eroded and/or worn from its original thickness, said indicator means is exposed relative to the remaining thickness of said lining, whereby said indicator monitors the erosion and/or wear of said lining.

* * * * *